US012564928B2

(12) United States Patent
Irokawa et al.

(10) Patent No.: US 12,564,928 B2
(45) Date of Patent: Mar. 3, 2026

(54) SENSOR UNIT, WORK MACHINE, COMMUNICATION METHOD, AND MANAGEMENT METHOD

(71) Applicant: Koki Holdings Co., Ltd., Tokyo (JP)

(72) Inventors: Hisashi Irokawa, Ibaraki (JP); Tomomasa Nishikawa, Ibaraki (JP); Shota Takeuchi, Ibaraki (JP); Kengo Tamura, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 456 days.

(21) Appl. No.: 18/013,899

(22) PCT Filed: Jul. 9, 2021

(86) PCT No.: PCT/JP2021/025914
§ 371 (c)(1),
(2) Date: Dec. 30, 2022

(87) PCT Pub. No.: WO2022/024716
PCT Pub. Date: Feb. 3, 2022

(65) Prior Publication Data
US 2023/0311292 A1 Oct. 5, 2023

(30) Foreign Application Priority Data
Jul. 31, 2020 (JP) ................................ 2020-130256

(51) Int. Cl.
*B25F 5/00* (2006.01)

(52) U.S. Cl.
CPC ..................................... *B25F 5/00* (2013.01)

(58) Field of Classification Search
CPC ........................................................ B25F 5/00
See application file for complete search history.

(56) References Cited

U.S. PATENT DOCUMENTS

2001/0039713 A1* 11/2001 Speller, Jr. ............... B23Q 5/40
173/149
2014/0184397 A1 7/2014 Volpert
(Continued)

FOREIGN PATENT DOCUMENTS

CN 103209866 7/2013
JP 2006142402 6/2006
(Continued)

OTHER PUBLICATIONS

"Office Action of China Counterpart Application", issued on Apr. 8, 2025, with English translation thereof, p. 1-p. 23.
(Continued)

*Primary Examiner* — Eyamindae C Jallow
(74) *Attorney, Agent, or Firm* — JCIPRNET

(57) ABSTRACT

The present invention improves the convenience of a work machine. A two-dimensional code 15*a* and a serial number 15*b* are marked on a name plate 15. The two-dimensional code 15*a* is a two-dimensional code indicating unique information such as the serial number of a work machine 1. A communication adapter 30 is connected to a battery pack mounting portion 2*c* of the work machine 1. The communication adapter 30 has a function of supplying power to the work machine 1 and a function of communicating with the work machine 1 and a PLC 60. A camera 67 reads the two-dimensional code 15*a* of the work machine 1, and transmits the serial number of the work machine 1 to the PLC 60. The PLC 60 transmits the serial number to the communication adapter 30. The work machine 1 stores the received serial number in its own internal memory.

14 Claims, 12 Drawing Sheets

(56) References Cited

U.S. PATENT DOCUMENTS

| | | | | |
|---|---|---|---|---|
| 2015/0165604 | A1* | 6/2015 | Bartoszek | B25B 21/02 173/1 |
| 2015/0372633 | A1* | 12/2015 | Machida | B25D 16/00 173/48 |
| 2017/0173750 | A1* | 6/2017 | Stock | B25F 5/006 |
| 2017/0222382 | A1* | 8/2017 | Peloquin | H01R 27/02 |
| 2020/0133229 | A1* | 4/2020 | Girt | B25F 5/00 |
| 2020/0156210 | A1 | 5/2020 | Sullivan et al. | |
| 2020/0230797 | A1* | 7/2020 | Frenken | B25F 5/00 |
| 2022/0407274 | A1* | 12/2022 | Radtke | H01R 43/0486 |

FOREIGN PATENT DOCUMENTS

| | | |
|---|---|---|
| JP | 2009279683 | 12/2009 |
| JP | 2012240169 | 12/2012 |
| JP | 2013101642 | 5/2013 |
| JP | 6038397 | 12/2016 |
| JP | 2019042860 | 3/2019 |
| JP | 2020074204 | 5/2020 |
| JP | 2020102863 | 7/2020 |
| WO | 2017056490 | 4/2017 |

OTHER PUBLICATIONS

"Office Action of Japan Counterpart Application", issued on Mar. 5, 2024, with English translation thereof, p. 1-p. 13.

"International Search Report (Form PCT/ISA/210) of PCT/JP2021/025914", mailed on Aug. 31, 2021, with English translation thereof, pp. 1-4.

"Decision of Refusal of Japan Counterpart Application", issued on Jul. 23, 2024, with English translation thereof, p. 1-p. 6.

* cited by examiner

| | Type name | Serial number | Identification symbol | Two-dimensional code |
|---|---|---|---|---|
| Main body | AAAA | J9100251 | A (Main Body) |  |
| Packing box | AAAA | J9100251 | B (Package) |  |

SENSOR UNIT, WORK MACHINE, COMMUNICATION METHOD, AND MANAGEMENT METHOD

CROSS-REFERENCE TO RELATED APPLICATION

This application is a 371 application of the International PCT application serial no. PCT/JP2021/025914, filed on Jul. 9, 2021, which claims the priority benefits of Japan Patent Application No. 2020-130256, filed on Jul. 31, 2020. The entirety of each of the above-mentioned patent applications is hereby incorporated by reference herein and made a part of this specification.

TECHNICAL FIELD

The present invention relates to a sensor unit configured to be mountable to a work machine, a work machine capable of communicating with the sensor unit, a communication method between the sensor unit and the work machine, and a management method of the work machine.

RELATED ART

In order to improve the convenience of a work machine such as an electric tool, it is considered beneficial to allow various types of information to be input to the work machine from outside. Patent Literature 1 below discloses a system in which setting values that a user sets by a computer are input from the computer to an electric tool via a communication cable and a communication connector to change the setting of the electric tool.

CITATION LIST

Patent Literature

[Patent Literature 1] Japanese Patent Laid-Open No. 2012-240169

SUMMARY OF INVENTION

Technical Problem

In order to improve the convenience of a work machine, it is considered beneficial to allow physical information collected by a sensor device provided outside the work machine to be input to the work machine. For example, if unique information of the work machine displayed by a bar code or a two-dimensional code can be collected by a code reader and stored in a storage part inside the work machine, the management of the work machine will be facilitated.

The first object of the present invention is to improve the convenience of a work machine. The second object of the present invention is to facilitate the management of a work machine.

Solution to Problem

One aspect of the present invention provides a sensor unit configured to be mountable to a work machine and including: a sensor device collecting physical information existing outside the sensor unit, converting the physical information collected into collected data, and outputting the collected data; a second interface configured to be connectable to the work machine; and a sensor unit controller configured to input the collected data output from the sensor device, and output the collected data and/or generated data generated from the collected data to the work machine via the second interface.

According to this aspect, by mounting the sensor unit to the work machine, it is possible to input the physical information collected from outside by the sensor unit to the work machine. Therefore, the convenience of the work machine is improved.

The sensor unit may have a communication adapter configured to relay communication between the sensor device and the work machine, and the communication adapter may be configured to have a first interface configured to be connectable to the sensor device, the second interface, and the sensor unit controller. According to this aspect, the sensor device can be disposed at a position away from the work machine and the communication adapter, which is convenient for collecting various physical information.

The sensor device may be configured as an optical sensor device that collects information about light as the physical information existing outside the sensor unit.

The first interface may be connectable to a computer device, and the sensor unit controller may be configured to be communicable with the sensor device via the computer device.

The second interface may be configured to have a first communication terminal configured to be mountable to a battery mounting portion of the work machine and configured to be communicable with the work machine, and a first power supply terminal configured to be capable of supplying power to the work machine.

Another aspect of the present invention provides a work machine for mounting the sensor unit and including: a third interface configured to be communicable with the second interface; a work machine controller configured to be communicable with the sensor unit controller via the third interface; and a work machine storage part configured as a non-volatile memory communicable with the work machine controller. The work machine controller stores the collected data and/or the generated data input from the sensor unit via the third interface in the work machine storage part.

According to this aspect, the collected data collected by the sensor device can be stored in the work machine storage part of the work machine. Therefore, the convenience of the work machine is improved. Alternatively, the management of the work machine is facilitated.

Another aspect of the present invention provides a communication method for communicating between the sensor unit and the work machine and including: inputting the collected data collected by the sensor device to the sensor unit controller; inputting the collected data and/or the generated data generated from the collected data to the work machine controller via the second interface and the third interface; and storing the collected data and/or the generated data input to the work machine controller in the work machine storage part.

According to this aspect, the collected data collected by the sensor device can be stored in the work machine storage part of the work machine. Therefore, the convenience of the work machine is improved.

The work machine may have a work machine casing configured to accommodate the work machine controller and the work machine storage part; and a unique information display part provided on an outer surface of the work machine casing and displaying unique information that is data unique to the work machine. According to this, the unique information collected by the sensor device can be stored in the work machine storage part of the work machine. Therefore, the convenience of the work machine is improved. Moreover, the management of the work machine is facilitated.

Another aspect of the present invention provides a communication method for communicating between the sensor unit and the work machine and including: collecting the unique information displayed on the unique information display part of the work machine as the collected data by the sensor device; inputting the collected data collected by the sensor device to the sensor unit controller; inputting the collected data and/or the generated data generated from the collected data to the work machine controller via the second interface and the third interface; and storing the collected data and/or the generated data input to the work machine controller in the work machine storage part.

According to this aspect, the unique information displayed on the unique information display part of the work machine can be easily stored in the work machine storage part of the work machine. Therefore, the convenience of the work machine can be improved. Moreover, the management of the work machine is facilitated.

Another aspect of the present invention provides a management method for managing the work machine and including: connecting a mobile terminal and the work machine controller to be wirelessly communicable with each other directly or indirectly; and transmitting the collected data and/or the generated data stored in the work machine storage part to the mobile terminal by wireless communication, and storing the collected data and/or the generated data in the mobile terminal. According to this, the information detected by the sensor device can be stored in the work machine and the mobile terminal. Therefore, the convenience of the work machine can be improved.

Another aspect of the present invention provides a management method for managing the work machine and including: connecting a mobile terminal and the work machine controller to be wirelessly communicable with each other directly or indirectly; and transmitting the unique information stored in the work machine storage part to the mobile terminal by wireless communication, and storing the unique information in the mobile terminal.

According to this aspect, the unique information of the work machine can be stored in the mobile terminal of the owner. Therefore, even if the first unique information display part of the work machine is peeled off and lost or if the work machine is stolen, by using the first unique information stored in the mobile terminal, the owner can show that he or she is the owner of the work machine. Therefore, the convenience of the work machine can be improved. Moreover, the management of the work machine is facilitated.

The management method may include: collecting the unique information displayed on the unique information display part of the work machine by the sensor device; collecting packing box unique information displayed on a packing box for accommodating the work machine by the sensor device; determining, by a computer device connected to the sensor device, whether the unique information and the packing box unique information read by the sensor device are preliminarily associated data; notifying of normality, by the computer device, when the unique information and the packing box unique information are determined to be preliminarily associated data; and notifying of abnormality, by the computer device, when the unique information and the packing box unique information are determined not to be preliminarily associated data by the computer device. According to this, it is possible to prevent the work machine from being put in the wrong packing box. Therefore, the management of the work machine is facilitated.

In the management method, the unique information and the packing box unique information may be data at least partially different from each other. According to this, when the unique information of the work machine is erroneously read twice, since the abnormality is notified by the computer device, it is possible to more reliably prevent the work machine from being put in the wrong packing box. Therefore, the management of the work machine is facilitated.

Another aspect of the present invention provides a work machine. The work machine includes a driving part, a driven part driven by the driving part, and a casing accommodating the driving part and the driven part. The work machine also includes: a first unique information display part provided on an outer surface of the casing and displaying first unique information that is unique information assigned to each work machine; a first unique information storage part incorporated in the casing and storing the first unique information; and a communication part incorporated in the casing and configured to be communicable between the first unique information storage part and an external device.

According to this aspect, the first unique information of the work machine can be acquired from both the first unique information display part provided on the outer surface of the casing and the first unique information communication part provided inside the casing. Therefore, the management of the work machine is facilitated.

Another aspect of the present invention provides a management method for storing first unique information displayed as a bar code or a two-dimensional code in a work machine and including: collecting the first unique information by a code reader serving as a sensor device; inputting the first unique information collected by the code reader or generated information generated from the first unique information to the work machine by a communication adapter mounted to the work machine; and storing the first unique information input by the communication adapter in a work machine storage part in a state of being incorporated in the work machine.

According to this aspect, the unique information displayed on the unique information display part of the work machine can be easily stored in the work machine storage part of the work machine. Therefore, the convenience of the work machine can be improved. Moreover, the management of the work machine is facilitated.

Any combination of the above constituent elements, and expressions of the present invention converted between systems are also effective as embodiments of the present invention.

Effects of Invention

According to the present invention, the convenience of the work machine can be improved and/or the management of the work machine can be facilitated.

DESCRIPTION OF EMBODIMENTS

Figure 1:
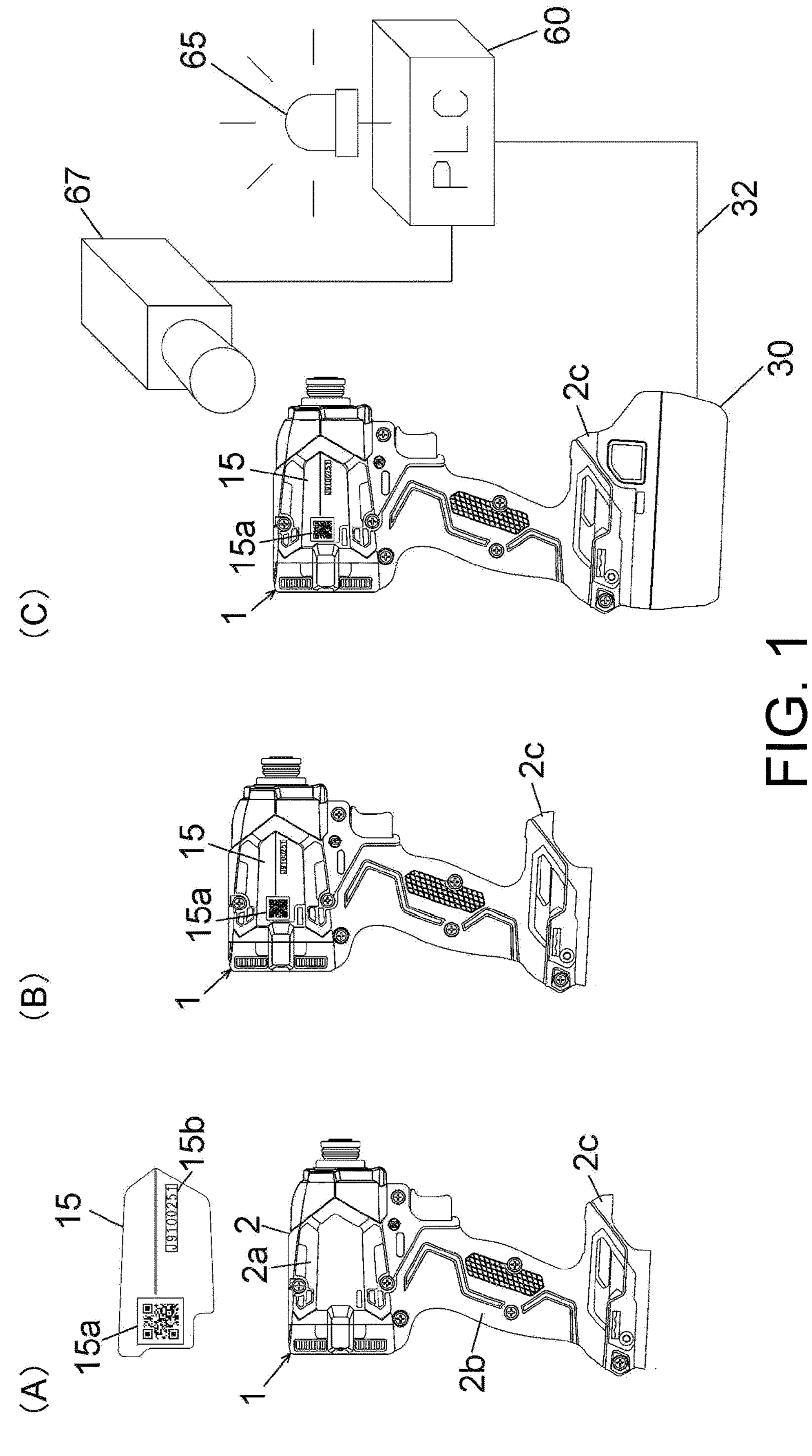
FIG. 1 is a schematic diagram of a management method according to an embodiment of the present invention, and is a schematic explanatory diagram showing a process of storing the unique information of the work machine 1 in the work machine 1.

Hereinafter, the same or equivalent constituent elements, members, processes, etc. shown in each drawing are denoted by the same reference numerals, and repeated descriptions will be omitted as appropriate. The embodiments are illustrative rather than limiting the invention. All the features and combinations thereof described in the embodiments are not necessarily essential to the invention.

The present embodiment relates to a sensor unit 68 having a camera 67 and a communication adapter (dedicated jig) 30, a work machine 1 capable of mounting the sensor unit 68, a communication method for communicating between the sensor unit 68 and the work machine 1, and a management method of the work machine 1. (A) of FIG. 1 shows the work machine 1 that has been assembled and a name plate (nameplate) 15 to be attached to the work machine 1. In (A) of FIG. 1, the name plate 15 is enlarged in scale compared with the work machine 1. The work machine 1 includes a housing 2 as a work machine casing. The housing 2 includes a body portion (cylindrical portion) 2*a*, a handle portion 2*b*, and a battery pack mounting portion 2*c*. (B) of FIG. 1 shows a state after the name plate 15 is attached to an outer surface of the body portion 2*a*. The name plate 15 displays a two-dimensional code 15*a* and a serial number 15*b*. The two-dimensional code 15*a* is, for example, a QR code (registered trademark). The two-dimensional code 15*a* and the serial number 15*b* are printed on a label and attached to the name plate 15, for example. Alternatively, the name plate 15 may be a label printed with the two-dimensional code 15*a* and the serial number 15*b*.

Figure 4:
FIG. 4 is a table showing an example of the unique information of the work machine 1, the unique information of the packing box 70, and the QR codes (registered trademark) corresponding thereto.
Figure 4:

The two-dimensional code 15*a* is an example of a unique information display part, and displays unique information, which is data unique to the work machine 1, in a two-dimensional code. As shown in FIG. 4, the unique information of the work machine 1 includes, for example, the type name, serial number, and identification symbol of the work machine 1. The type name may be expressed as a model number or a model name. The serial number is a number (number assigned to each work machine) that can uniquely identify the work machine 1. The identification symbol is a symbol for distinguishing between the work machine 1 and the packing box 70 shown in FIG. 2 that accommodates the work machine 1. The identification symbol "A" indicates the work machine 1. The identification symbol "B" indicates the packing box 70. Due to the presence of the identification symbol, in the PLC 60, it can distinguish between the case of reading the two-dimensional code 15*a* of the work machine 1 and the case of reading the two-dimensional code 70*a* of the packing box 70 of FIG. 2 by the camera 67.

(C) of FIG. 1 schematically shows how the unique information of the work machine 1 is stored in the work machine 1. (C) of FIG. 1 is also a conceptual diagram of a first management system, which will be described later with reference to FIG. 8. The communication adapter 30 constituting the sensor unit 68 is connected to the battery pack mounting portion 2*c* of the work machine 1. The communication adapter 30 can be connected to the battery pack mounting portion 2*c* in the same manner as the battery pack 20 shown in FIG. 7 that serves as the power supply of the work machine 1. The communication adapter 30 has a function of supplying power to the work machine 1 and a function of communicating with the work machine 1 and the PLC (Programmable Logic Controller) 60. The communication adapter 30 is configured to relay communication between the work machine 1 and the PLC 60 and the camera 67. The PLC 60 is an example of a computer device or an external device. The PLC 60 is electrically connected to the camera 67 and is electrically connected to the communication adapter 30 via a cable 32, which is an example of a first interface. The camera 67 is an example of a sensor device or an optical sensor device. The camera 67 may be a dedicated camera specialized for reading codes or a scanner, a code reader, etc.

The camera 67 reads the two-dimensional code 15*a* of the work machine 1 and transmits collected data obtained by reading, that is, the unique information of the work machine 1, to the PLC 60. The camera 67 collects (scans) the two-dimensional code 15*a* as information about light. The information of the two-dimensional code 15*a* collected (scanned) by the camera 67 is converted into image data by the camera 67 to serve as the collected data. In the present embodiment, the collected data is the unique information of the work machine 1 that the camera 67 reads from the two-dimensional code 15*a* (obtained by converting the image data of the two-dimensional code 15*a*). The information about light is an example of the physical information collected by the camera 67 serving as a sensor device. The sensor device is not limited to the camera 67, and it is also conceivable to configure a sensor device that collects any of information about light, information about sound, information about electromagnetic waves, and information about acceleration. In addition, it is also conceivable to collect secondary physical information such as images, videos, audios, distances, positions, tilts, vibrations, etc. calculated from primary physical information such as light, sound, electromagnetic waves, and acceleration as the physical information collected by the sensor device. It is conceivable to collect physical information that exists outside the sensor unit 68, such as images, videos, and audios, as the physical information collected by the sensor device, but it is also conceivable to collect physical information indicating the position and movement of the sensor unit 68, such as the distance between the sensor unit 68 and an object, and the position, tilt, and vibration of the sensor unit 68. It is conceivable to collect these pieces of physical information as history information indicating the working status of the work machine 1. It is considered that, by inputting such physical information to the work machine, the convenience of the work machine is improved or the management of the work machine is facilitated. Moreover, in such a sensor unit 68, the camera 67 and the communication adapter 30 may be configured to be connected to each other via a cable, but the camera 67 and the communication adapter 30 may be configured integrally. The PLC 60 transmits to the communication adapter 30 generated data obtained by removing the identification symbol from the received collected data. The collected data may be transmitted from the PLC 60 to the communication adapter 30. The communication adapter 30 transmits the received generated data to the work machine 1. The work machine 1 stores the received generated data in its internal memory (storage part 46 in FIG. 8). The storage part 46 is configured by a non-volatile memory that can retain stored information even when power is not supplied. When the data is correctly stored, the PLC 60 blinks (intermittently lights) a lamp 65 serving as a notification part in blue to notify the worker.

Figure 2:
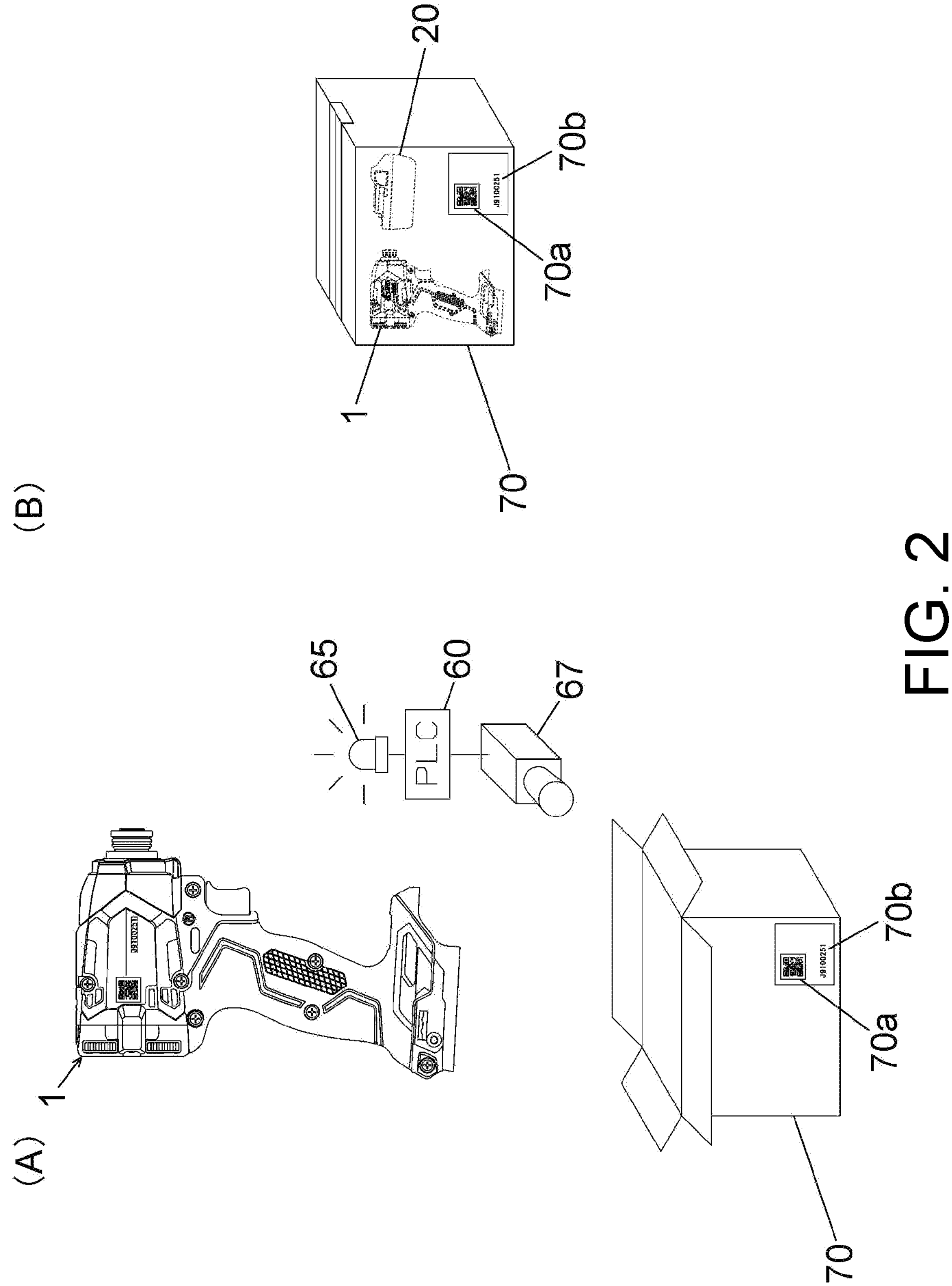
FIG. 2 is a schematic diagram of the management method, and is a schematic diagram showing a process of packing the work machine 1 in the packing box 70 having unique information corresponding to the unique information of the work machine 1.

(A) of FIG. 2 shows a state before the work machine 1 is packed in the packing box 70. A two-dimensional code 70*a* and a serial number 70*b* are displayed on the packing box 70. The two-dimensional code 70*a* and the serial number 70*b* are printed on a label and attached to the packing box 70, for example. Alternatively, the two-dimensional code 70*a* and the serial number 70*b* may be printed directly on the packing box 70. The two-dimensional code 70*a* is, for example, a QR code (registered trademark). The two-dimensional code 70*a* is an example of a packing box unique information display part, and displays packing box unique information, which is data unique to the packing box 70, in a two-dimensional code. As shown in FIG. 4, the packing box unique information includes, for example, the type name and serial number of the work machine 1 to be packed in the packing box 70 and the identification symbol of the packing box 70. The unique information of the work machine 1 and the corresponding packing box unique information are different in that the identification symbol of the unique information of the work machine 1 is "A" and the identification symbol of the packing box unique information is "B".

The camera 67 reads the two-dimensional code 70*a* of the packing box 70 and transmits the read content, that is, the packing box unique information, to the PLC 60. The PLC 60 determines whether the received packing box unique information corresponds (preliminarily associated data) to the previously received collected data (the unique information of the work machine 1). Whether the information corresponds to each other is determined by whether the serial numbers respectively included in the collected data and the packing box unique information match. If both serial numbers match, the information corresponds to each other, and if both serial numbers do not match, the information does not correspond to each other. When the received packing box unique information corresponds to the collected data, the PLC 60 lights the lamp 65 in blue to notify the worker of normality. When the received packing box unique information does not correspond to the collected data, the PLC 60 lights the lamp 65 in red to notify the worker of abnormality. When the two-dimensional code 15*a* of the work machine 1 is read while the two-dimensional code 70*a* of the packing box 70 should be read, that is, when the two-dimensional code 15*a* of the work machine 1 is read twice, both of the read information have the identification symbol "A", and in this case, the PLC 60 also lights the lamp 65 in red to notify the worker of abnormality. The worker confirms that the lamp 65 is lit in blue, and packs the work machine 1 in the packing box 70 as shown in (B) of FIG. 2. At this time, if necessary, the battery pack 20 serving as the power supply of the work machine 1 is packed in the packing box 70 together with the work machine 1.

Figure 3:
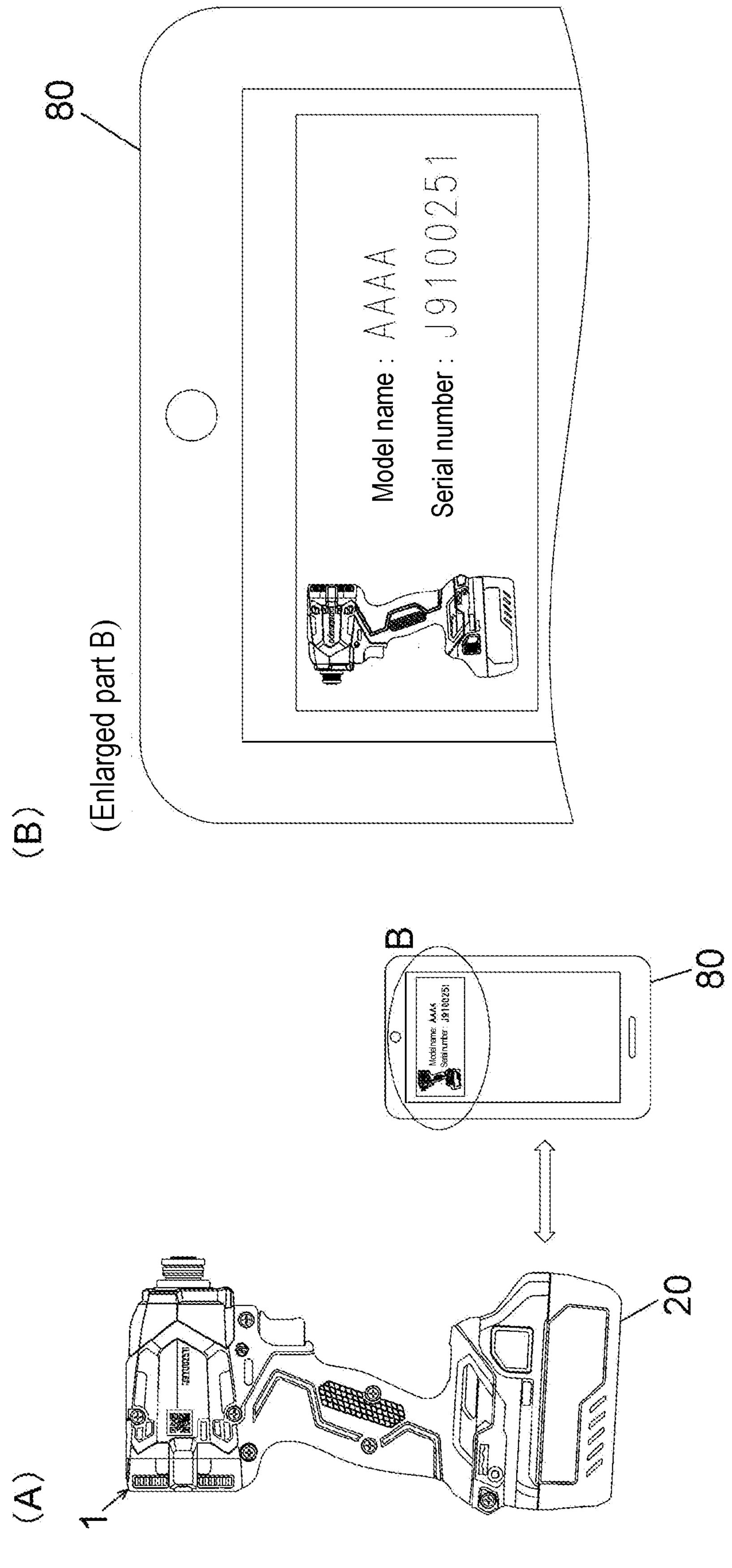
FIG. 3 is a schematic diagram of the management method, and is a schematic diagram showing a process of storing the unique information of the work machine 1 in the mobile terminal 80.

The management method shown in FIG. 1 and FIG. 2 is performed, for example, in an assembly line of the work machine 1. In contrast thereto, the management method shown in FIG. 3 is performed, for example, on the side of the user who purchased the work machine 1. (A) of FIG. 3 shows a process of storing the unique information of the work machine 1 in a mobile terminal 80. (A) of FIG. 3 is also a conceptual diagram of a second management system, which will be described later with reference to FIG. 12. The mobile terminal 80 is, for example, a smart phone or a tablet terminal. A management application (hereinafter referred to as "management application") is installed in the mobile terminal 80. The battery pack 20 is connected to the work machine 1. The mobile terminal 80 and the battery pack 20 each have a short-range wireless communication function such as Bluetooth (registered trademark), and are capable of communicating with each other wirelessly. The mobile terminal 80 acquires the unique information of the work machine 1 to which the battery pack 20 is connected by wireless communication with the battery pack 20, and stores the unique information in its internal memory (storage part 82 in FIG. 12). (B) of FIG. 3 shows an enlarged example of the display content of the management application of the mobile terminal 80 that stores the unique information of the work machine 1.

Figure 5:
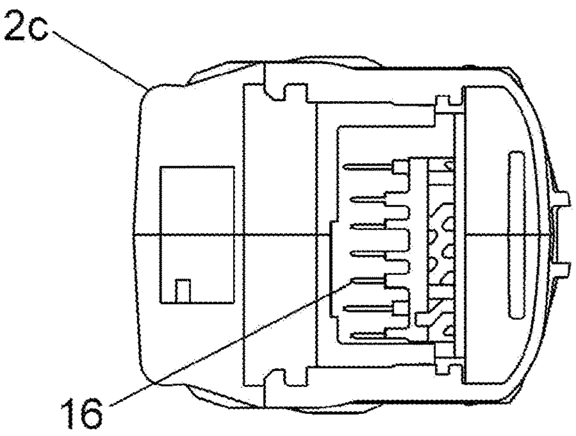
FIG. 5 is a view of the battery pack mounting portion 2*c* of the work machine 1 as viewed from below.
Figure 6:
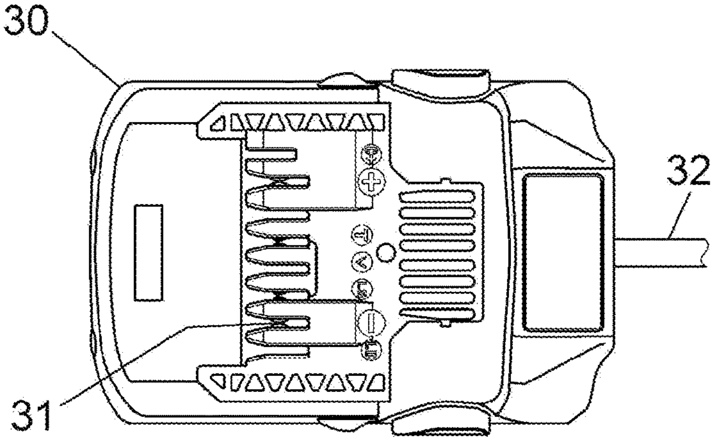
FIG. 6 is a view of the communication adapter 30 connected to the battery pack mounting portion 2*c* as viewed from above.

FIG. 5 is a view of the battery pack mounting portion 2*c* of the work machine 1 as viewed from below. FIG. 6 is a view of the communication adapter 30 connected to the battery pack mounting portion 2*c* as viewed from above. The battery pack mounting portion 2*c* is provided with a plurality of terminals 16, which are examples of a third interface. At least some of the terminals 16 are shared for electrical connection with the battery pack 20 and electrical connection with the communication adapter 30. The communication adapter 30 is provided with a plurality of terminals 31 serving as a second interface. In a state where the work machine 1 and the communication adapter 30 are connected to each other as shown in (C) of FIG. 1, the terminals 16 and the terminals 31 are in contact with each other and electrically connected, and are capable of communicating with each other.

Figure 7:
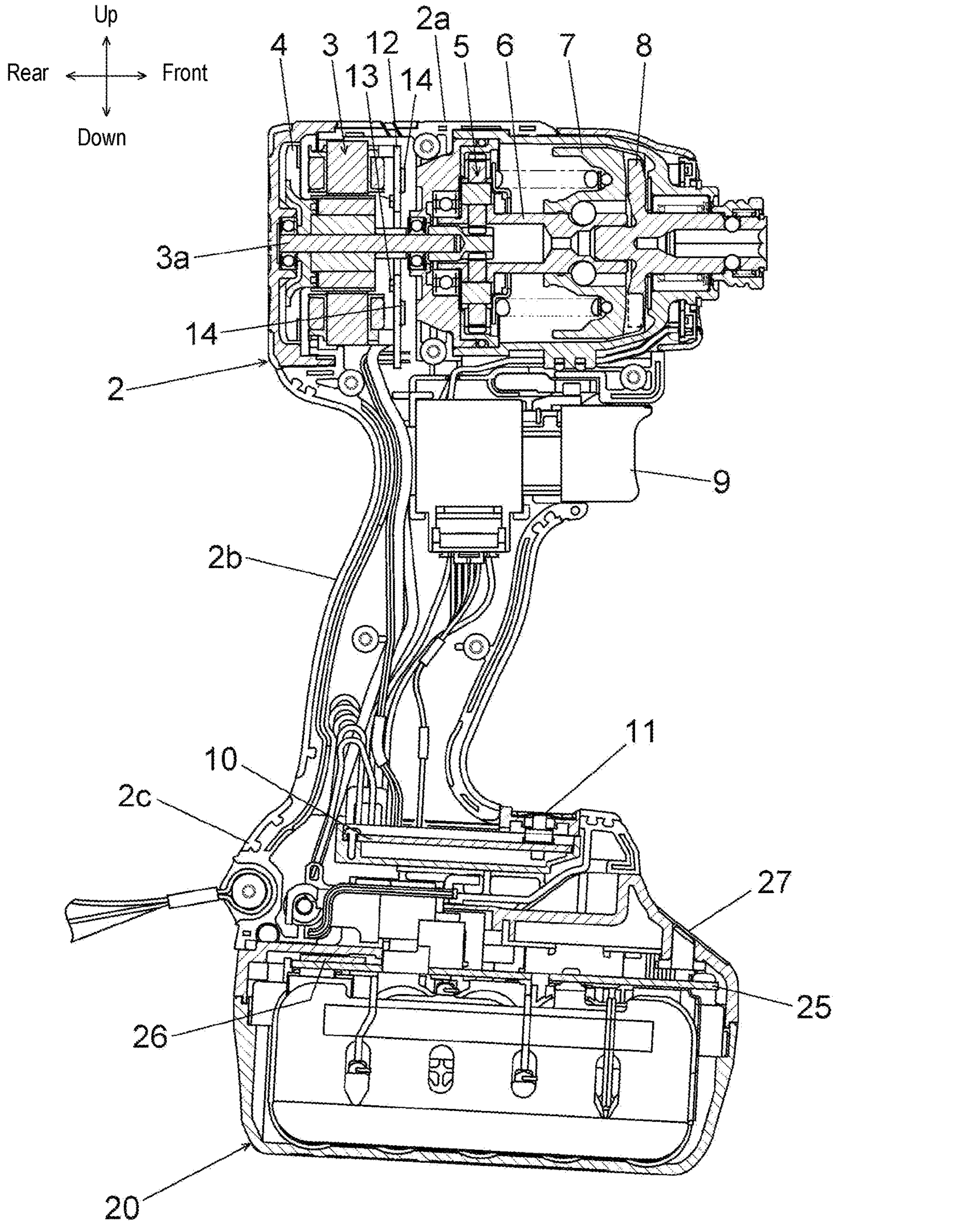
FIG. 7 is a cross-sectional side view of the work machine 1 connecting the battery pack 20.

FIG. 7 is a cross-sectional side view of the work machine 1 connecting the battery pack 20. The front-rear direction and up-down direction of the work machine 1 that are orthogonal to each other are defined by FIG. 7. The front-rear direction is a direction parallel to the central axis of an output shaft 3*a* of a motor 3. The work machine 1 is an electric tool, specifically, a cordless impact driver. The body portion 2*a* of the housing 2 has a cylindrical shape, and the central axis thereof is parallel to the front-rear direction. The handle portion 2b extends downward from an intermediate portion of the body portion 2a. The battery pack mounting portion 2c is provided at the lower end portion of the handle portion 2b.

In the body portion 2a, a fan 4, a stator and a rotor of the motor 3 serving as a driving part, a sensor/inverter circuit board 12, a planetary gear mechanism (deceleration mechanism) 5, a spindle 6, a hammer 7, and an anvil 8 are provided in order from the rear. The fan 4 is directly connected to the output shaft 3a of the motor 3, rotates together with the motor 3, and generates cooling air in the housing 2. The motor 3 is an inner rotor type brushless motor here. The sensor/inverter circuit board 12 is supported by the body portion 2a so as to be perpendicular to the front-rear direction. The sensor/inverter circuit board 12 has a magnetic sensor 13 such as a Hall IC mounted on the back surface, and a plurality of switching elements 14 mounted on the front surface. The magnetic sensor 13 is for detecting the rotation position of the motor 3. The switching elements 14 are for current supply to the motor 3. The plurality of switching elements 14 correspond to switching elements Q1 to Q6 in FIG. 8. The output shaft 3a of the motor 3 penetrates the sensor/inverter circuit board 12 and extends forward. The planetary gear mechanism 5 decelerates the rotation of the motor 3 and transmits it to the spindle 6. The hammer 7 rotates together with the spindle 6 and rotates or rotationally impacts the anvil 8. A tip tool such as a bit (not shown) is attached to the anvil 8. The spindle 6, the hammer 7, and the anvil 8 are examples of a driven part and constitute a well-known rotary impact mechanism (impact mechanism).

A trigger switch 9 is provided at the front portion of the upper end of the handle portion 2b. The trigger switch 9 is an operation part for the worker to switch between the drive and stop of the motor 3. A work machine control board 10 is provided in the upper portion of the battery pack mounting portion 2c. The work machine control board 10 is provided with a calculation part 40, etc. shown in FIG. 8. A mode switching part 11 is provided on the upper surface of the battery pack mounting portion 2c. The mode switching part 11 is an operation part for switching the operation mode of the work machine 1, for example, among strong (high speed), medium (medium speed), and weak (low speed) modes.

The battery pack 20 is connected to the battery pack mounting portion 2c. The battery pack 20 accommodates a battery cell 21 shown in FIG. 12 and accommodates a battery control board 25. The battery control board 25 is equipped with a communication part (battery communication part) 26 for short-range wireless communication. The communication part 26 is, for example, a BLE (Bluetooth Low Energy) module. A panel part 27 is provided on the outer surface of the battery pack 20. The panel part 27 is provided with a button for displaying the remaining power amount of the battery pack 20 and a button for switching on/off of the short-range wireless communication function.

Figure 8:
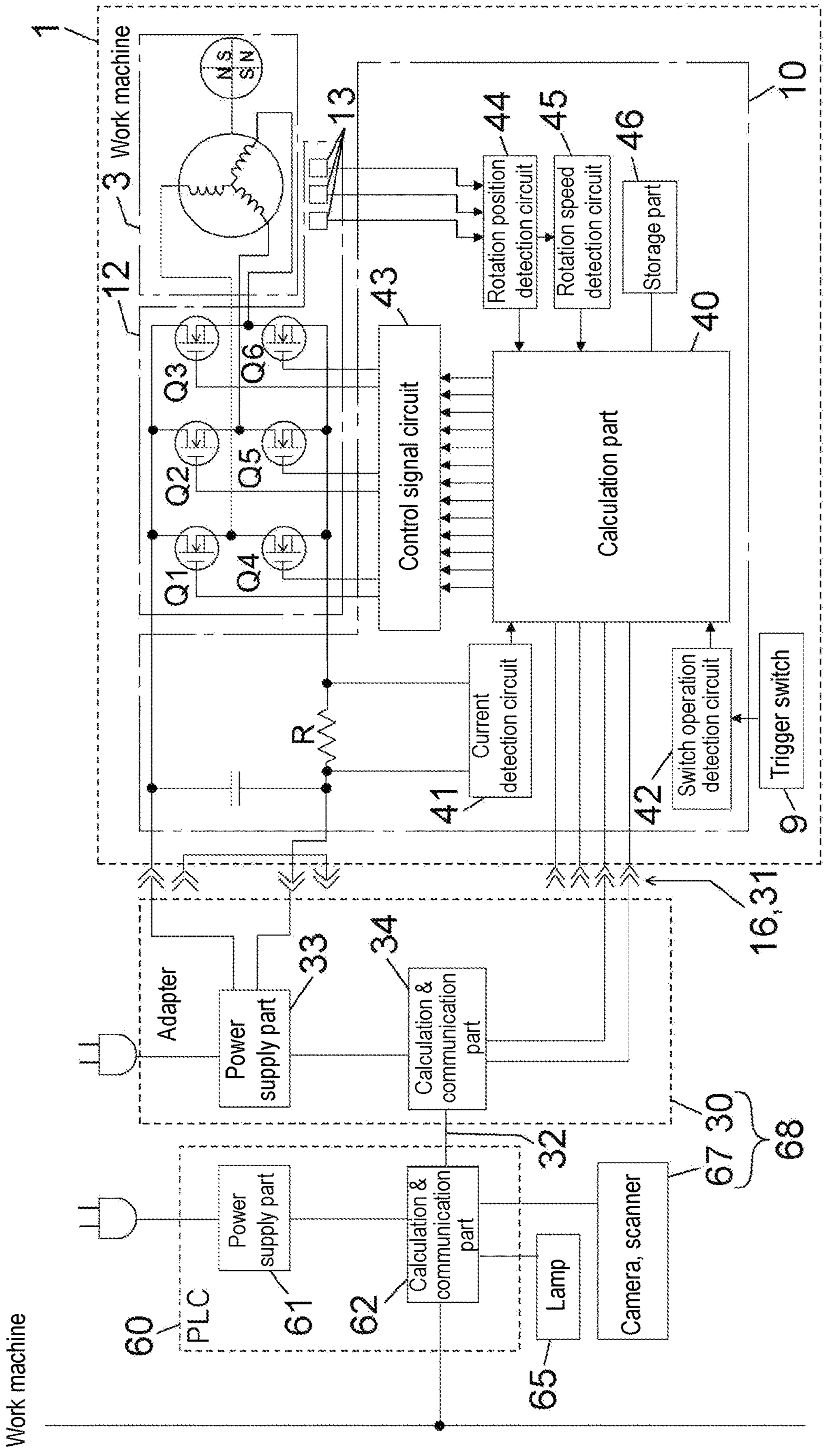
FIG. 8 is a circuit block diagram of the first management system that manages the work machine 1.

FIG. 8 is a circuit block diagram of the first management system that manages the work machine 1. The first management system stores the unique information of the work machine 1 in the storage part 46 of the work machine 1. The communication adapter 30 is electrically connected to the work machine 1 by interconnection of the terminals 16 and the terminals 31 shown in FIG. 5 and FIG. 6, and is capable of supplying power to the work machine 1 and capable of communicating with the work machine 1. The communication adapter 30 has a power supply part 33 and a calculation/communication part 34 serving as an adapter-side controller (sensor unit controller). The power supply part 33 converts AC power supplied from an external AC power supply into DC power, and supplies the DC power to the work machine 1 and the calculation/communication part 34. The calculation/communication part 34 includes a microcontroller or the like, and communicates with the calculation/communication part 62 of the PLC 60 and the calculation part 40 of the work machine 1.

The PLC 60 has a power supply part 61 and the calculation/communication part 62 serving as a device-side controller. The power supply part 61 converts AC power supplied from an external AC power supply into DC power, and supplies the DC power to the calculation/communication part 62. The calculation/communication part 62 includes a microcontroller or the like, and communicates with the calculation/communication part 34 of the communication adapter 30 and the camera 67 and controls the operation (lighting state) of the lamp 65. Further, the calculation/communication part 62 is connected to a factory network.

In the work machine 1, the switching elements Q1 to Q6 provided on the sensor/inverter circuit board 12 are connected in a three-phase bridge to constitute an inverter circuit. The switching elements Q1 to Q6 perform a switching operation according to the control of the calculation part 40 to supply driving power to the motor 3. The magnetic sensor 13 provided on the sensor/inverter circuit board 12 transmits an electrical signal corresponding to the rotation position of the motor 3 to the rotation position detection circuit 44. The work machine control board 10 is provided with the calculation part 40 serving as a work machine controller, a current detection circuit 41, a switch operation detection circuit 42, a control signal circuit (control signal output circuit) 43, the rotation position detection circuit 44, a rotation speed detection circuit 45, and the storage part (work machine storage part) 46.

The current detection circuit 41 detects the current of the motor 3 by the voltage of a resistor R provided in the current path of the motor 3 and transmits it to the calculation part 40. The switch operation detection circuit 42 detects the operation of the trigger switch 9 and transmits it to the calculation part 40. The control signal circuit 43 applies a control signal (for example, PWM signal) to each control terminal of the switching elements Q1 to Q6 according to the control of the calculation part 40. The rotation position detection circuit 44 detects the rotation position of the motor 3 by the signal from the magnetic sensor 13 and transmits it to the calculation part 40. The rotation speed detection circuit 45 detects the rotation speed of the motor 3 by the signal from the rotation position detection circuit 44 and transmits it to the calculation part 40. The storage part 46 stores the unique information of the work machine 1, usage history information of the work machine 1, etc. The storage part 46 may be separate from the calculation part 40 or may be built in the calculation part 40. The calculation part 40 controls the on/off of the switching elements Q1 to Q6 (for example, PWM control) via the control signal circuit 43 according to the operation of the trigger switch 9, the rotation position and rotation speed of the motor 3, and the current of the motor 3 to control the drive of the motor 3.

Figure 9:
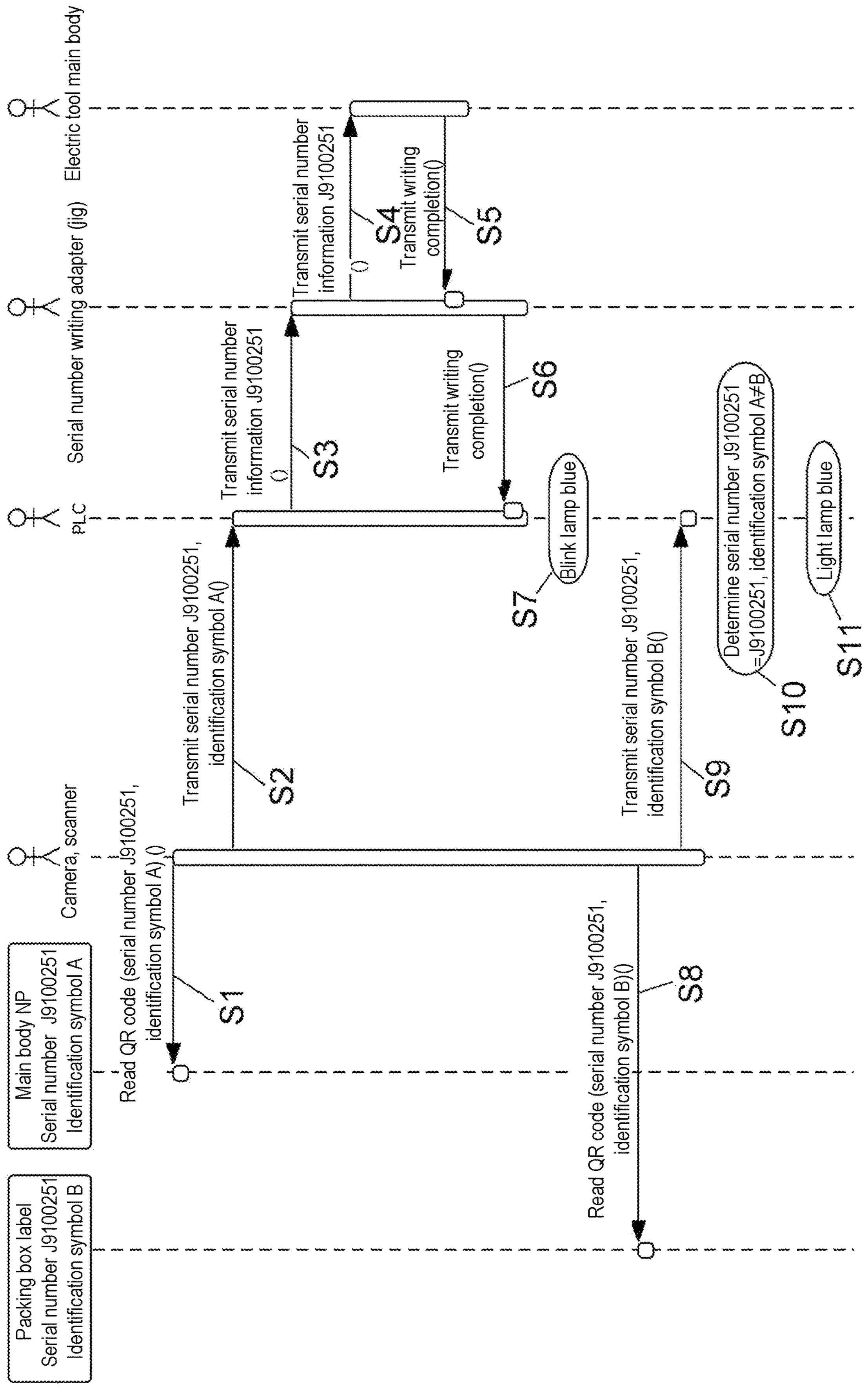
FIG. 9 is a sequence diagram showing an example of the operation of the first management system, and is a sequence diagram showing the operation when there is no abnormality.

FIG. 9 is a sequence diagram showing an example of the operation of the first management system shown in FIG. 8, and is a sequence diagram showing the operation when there is no abnormality. Here, it is assumed that the work machine 1 with the serial number "J9100251" and the packing box 70 corresponding thereto are prepared. A worker (hereinafter simply referred to as "worker") on an assembly line connects the communication adapter 30 to the work machine 1 as shown in (C) of FIG. 1, and then reads the two-dimensional code 15*a* of the work machine 1 by the camera 67 (S1). As a result, the serial number "J9100251" and the identification symbol "A" are read. The camera 67 transmits the serial number "J9100251" and the identification symbol "A" read to the calculation/communication part 62 of the PLC 60 (S2). The calculation/communication part 62 stores the serial number "J9100251" and the identification symbol "A" received, and transmits the serial number "J9100251" to the calculation/communication part 34 of the communication adapter 30 (S3). The calculation/communication part 34 transmits the received serial number "J9100251" to the calculation part 40 of the work machine 1 (S4). The calculation part 40 writes (stores) the received serial number "J9100251" in the storage part 46, and transmits a signal indicating writing completion (hereinafter "writing completion signal") to the calculation/communication part 34 of the communication adapter 30 (S5). The calculation/communication part 34 transmits the writing completion signal to the PLC 60 (S6). The PLC 60 receiving the writing completion signal blinks the lamp 65 in blue (S7) to notify the worker of normal writing completion.

The worker confirming the lamp 65 blinking in blue removes the communication adapter from the work machine 1 and reads the two-dimensional code 70*a* of the packing box 70 by the camera 67 (S8). As a result, the serial number "J9100251" and the identification symbol "B" are read. The camera 67 transmits the serial number "J9100251" and the identification symbol "B" read to the calculation/communication part 62 of the PLC 60 (S9). The calculation/communication part 62 compares the serial number "J9100251" and the identification symbol "B" received with the serial number "J9100251" and the identification symbol "A" of the work machine 1 received previously in S2, determines that the serial numbers of both received data are the same as "J9100251" and that the identification symbols are different as "A" and "B" (S10), and lights (continuously lights) the lamp 65 in blue (S11) to notify the worker of normality, that is, that the work machine 1 can be packed in the packing box 70. Although omitted in the above description, the type name of the work machine 1 may also be included as a communication target and stored in the storage part 46.

Figure 10:
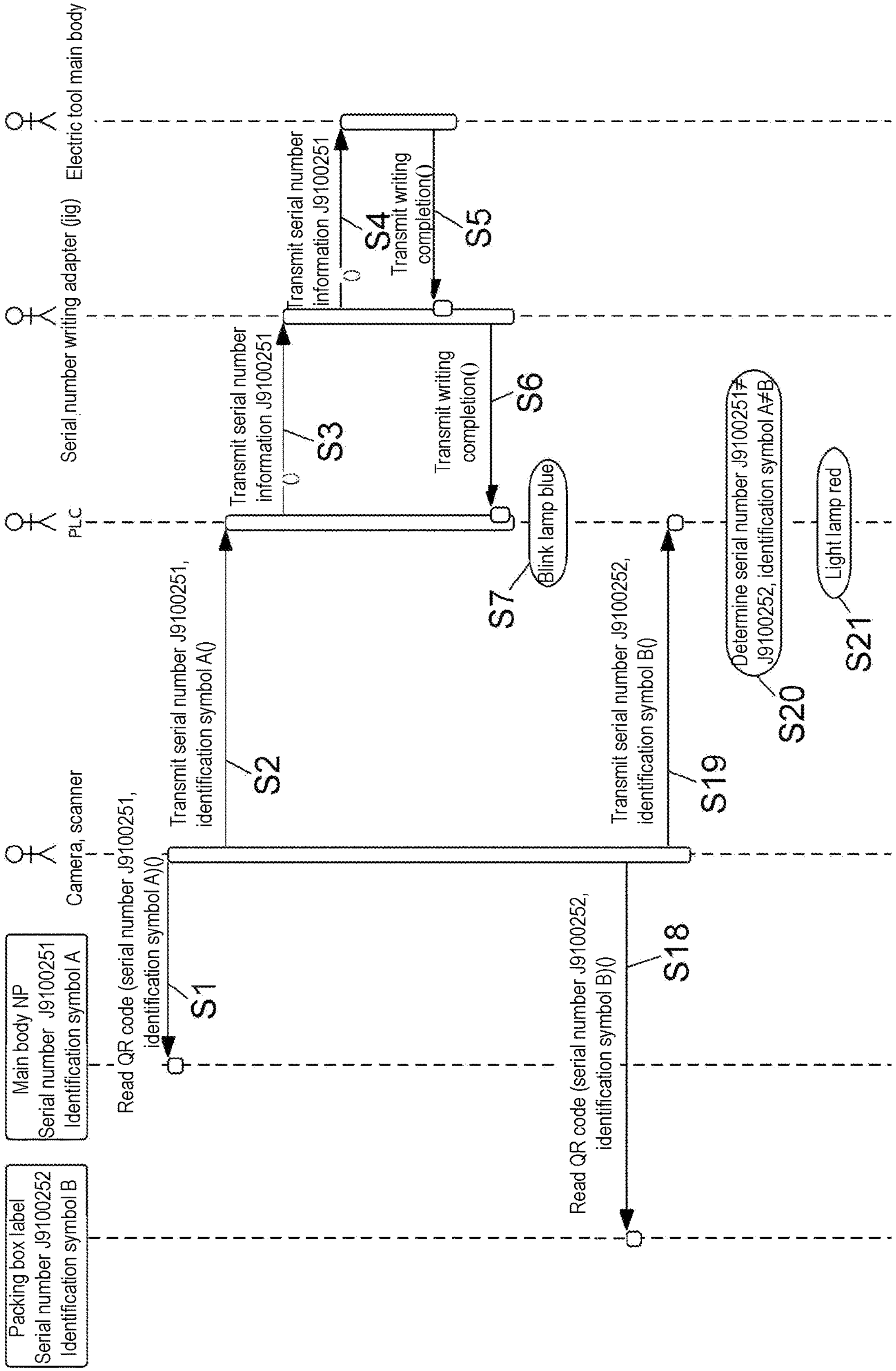
FIG. 10 is a sequence diagram showing an example of the operation of the first management system, and is a sequence diagram showing the operation when the unique information of the packing box 70 does not correspond to the unique information of the work machine 1.

FIG. 10 is a sequence diagram showing an example of the operation of the first management system, and is a sequence diagram showing the operation when the serial number "J9100252" included in the unique information of the packing box 70 does not match the serial number "J9100251" included in the unique information of the work machine 1. In FIG. 10, the operation from S1 to S7 is the same as in FIG. 9. The worker reads the two-dimensional code 70*a* of the packing box 70 by the camera 67 (S18). As a result, the serial number "J9100252" and the identification symbol "B" are read. The camera 67 transmits the serial number "J9100252" and the identification symbol "B" read to the calculation/communication part 62 of the PLC 60 (S19). The calculation/communication part 62 compares the serial number "J9100252" and the identification symbol "B" received with the serial number "J9100251" and the identification symbol "A" of the work machine 1 received previously in S2, determines that the serial numbers of both received data are different as "J9100252" and "J9100251" (S20), and lights the lamp 65 in red (S21) to notify the worker of abnormality.

Figure 11:
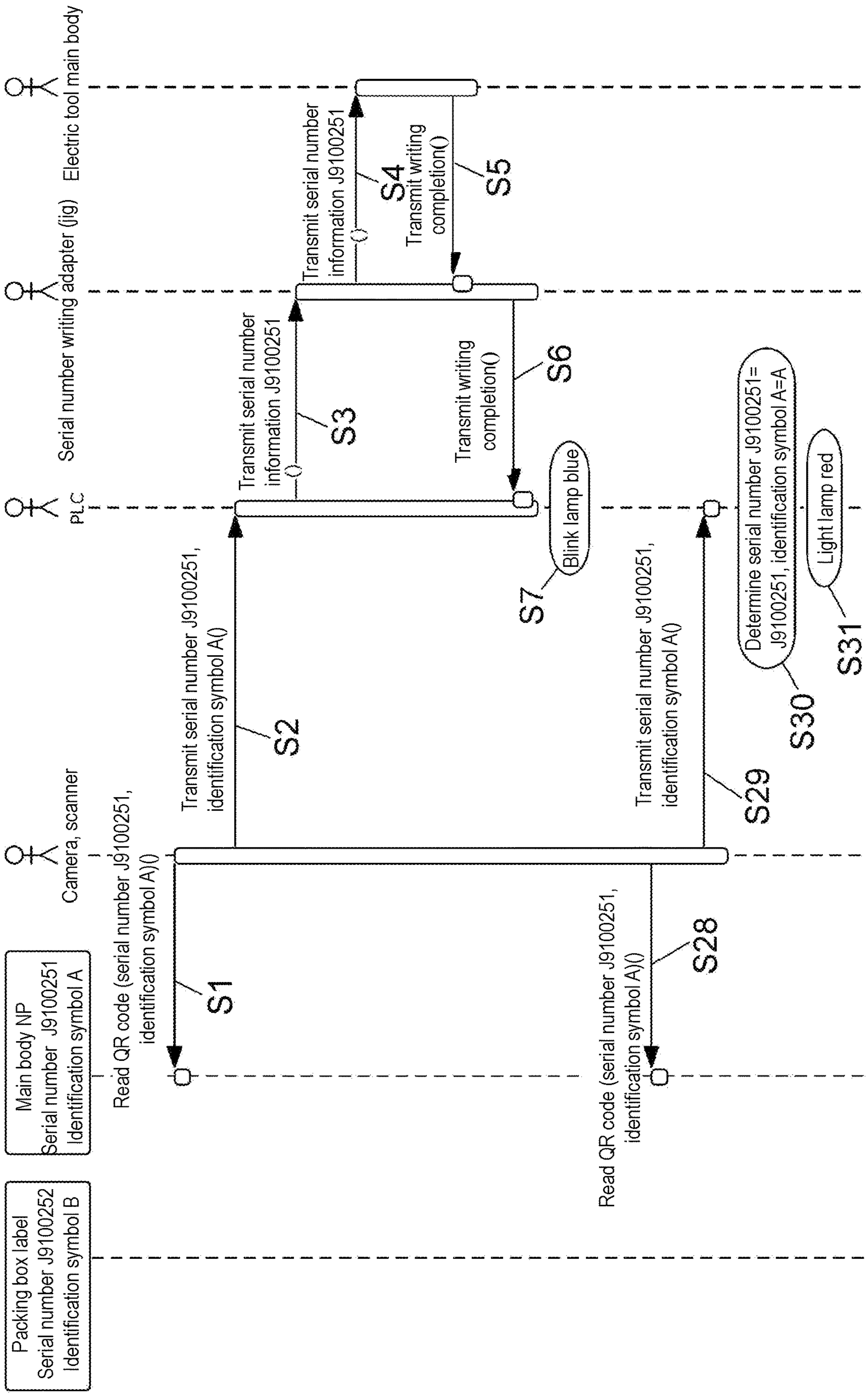
FIG. 11 is a sequence diagram showing an example of the operation of the first management system, and is a sequence diagram showing the operation when the unique information of the work machine 1 is read while the unique information of the packing box 70 should be read.

FIG. 11 is a sequence diagram showing an example of the operation of the first management system, and is a sequence diagram showing the operation when the unique information of the work machine 1 is read while the unique information of the packing box 70 should be read. In FIG. 11, the operation from S1 to S7 is the same as in FIG. 9. The worker reads again the two-dimensional code 15*a* of the work machine 1 instead of the two-dimensional code 70*a* of the packing box 70 by the camera 67 (S28). As a result, the serial number "J9100251" and the identification symbol "A" are read. The camera 67 transmits the serial number "J9100251" and the identification symbol "A" read to the calculation/communication part 62 of the PLC 60 (S29). The calculation/communication part 62 compares the serial number "J9100251" and the identification symbol "A" received with the serial number "J9100251" and the identification symbol "A" of the work machine 1 received previously in S2, determines that the serial numbers of both received data are the same as "J9100251" and the identification symbols are the same as "A" (S30), and lights the lamp 65 in red (S31) to notify the worker of abnormality. In one of S21 and S31, the lamp 65 may be blinked in red, and in the other, the lamp 65 may be lit in red.

Figure 12:
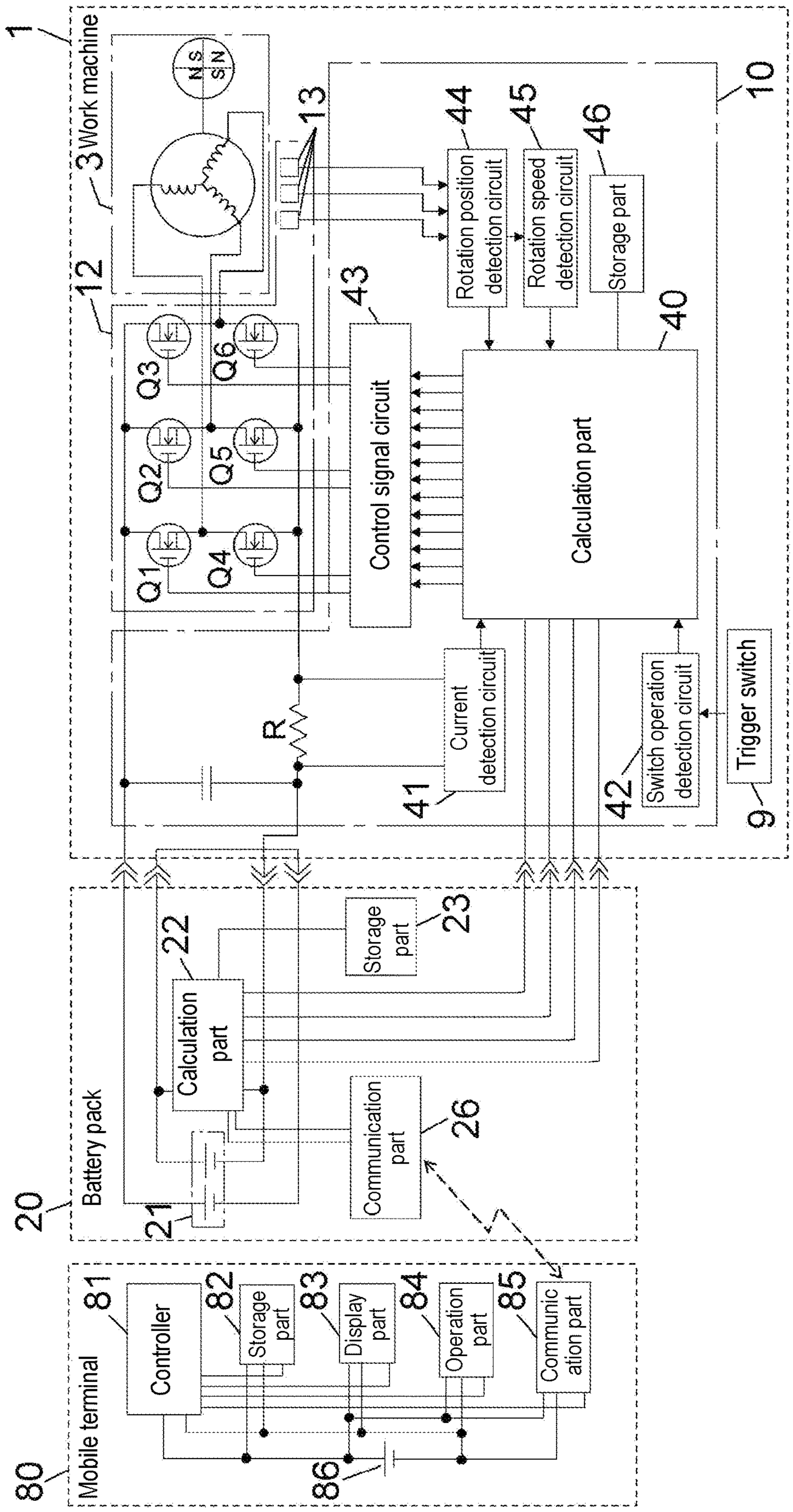
FIG. 12 is a circuit block diagram of the second management system that manages the work machine 1.

FIG. 12 is a circuit block diagram of the second management system that manages the work machine 1. The battery pack 20 has a battery cell group 21, a calculation part 22 serving as a battery controller, a storage part 23 serving as a battery storage part, and a communication part 26 serving as a battery communication part. The battery cell group 21 is composed of a plurality of battery cells such as lithium ion secondary battery cells. The number of series connections and the number of parallel connections of the plurality of battery cells are arbitrary. The calculation part 22 includes a microcontroller or the like, and communicates (wired communication) with the calculation part 40 of the work machine 1 and controls the communication part 26. The storage part 23 stores the unique information of the battery pack 20, such as the type name and serial number. The communication part 26 communicates (wireless communication) with the communication part 85 of the mobile terminal 80.

The mobile terminal 80 includes a controller 81 serving as a terminal controller, a storage part 82 serving as a terminal storage part, a display part 83, an operation part 84, a communication part 85 serving as a terminal communication part, and a battery 86. If the mobile terminal 80 is a smart phone or a tablet terminal, the screen of the smart phone or the tablet terminal is the display part 83 as well as the operation part 84. The communication part 85 has a short-range wireless communication function such as Bluetooth (registered trademark), and communicates with the communication part 26 of the battery pack 20. A management application is installed in the storage part 82. The controller 81 executes each function of the management application.

Figure 13:
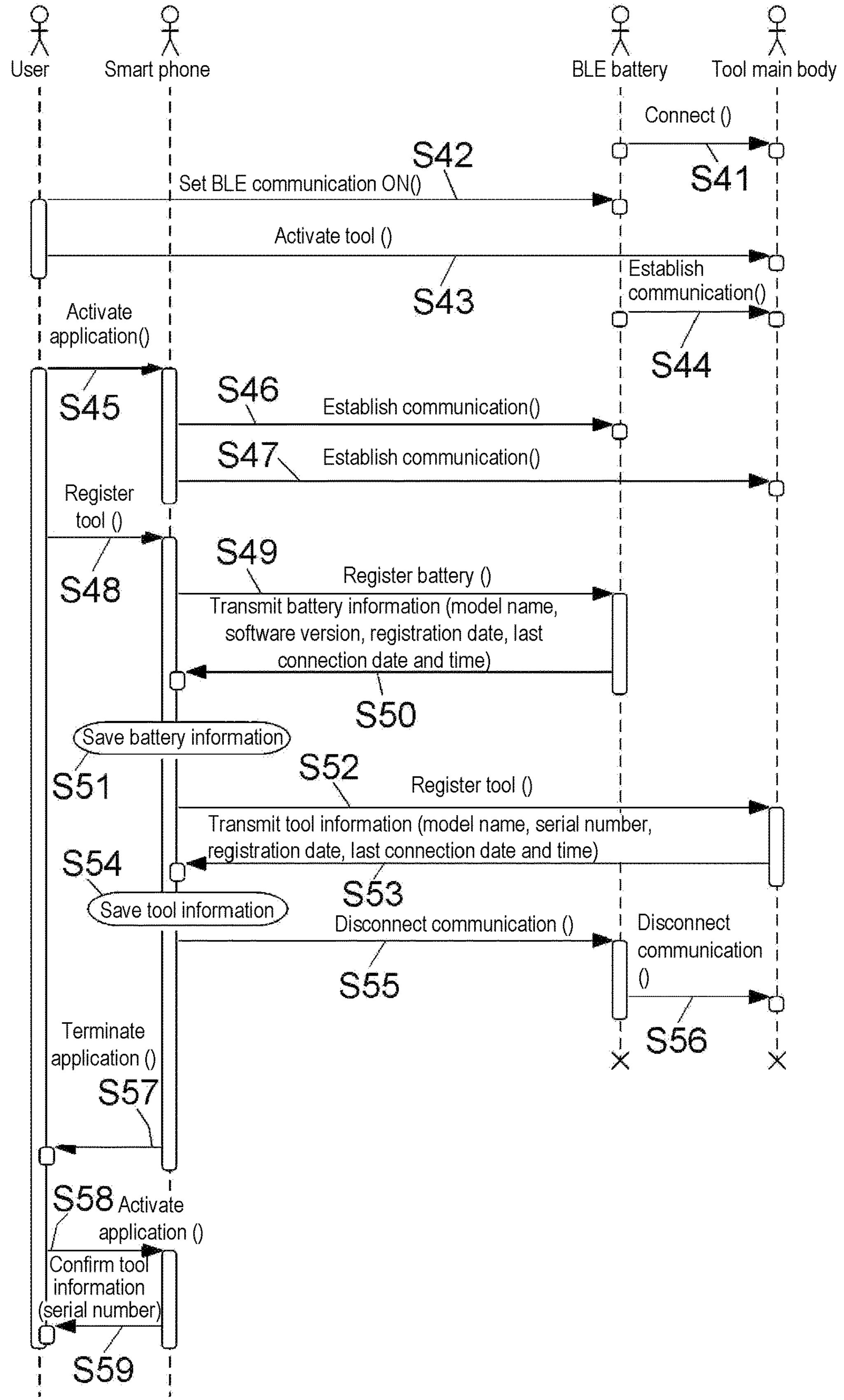
FIG. 13 is a sequence diagram showing an example of the operation of the second management system.

FIG. 13 is a sequence diagram showing an example of the operation of the second management system. The user connects the battery pack 20 to the work machine 1 (S41). The user operates the panel part 27 of the battery pack 20 to turn on the short-range wireless communication function of the battery pack 20 (S42). The user temporarily turns on the trigger switch 9 of the work machine 1 to activate the calculation part 40 of the work machine 1 (S43). As a result, communication between the calculation part 22 of the battery pack 20 and the calculation part 40 of the work machine 1 is established (S44). The user operates the mobile terminal 80 to activate the management application (S45). Due to the function of the management application, short-range wireless communication between the communication part 85 of the mobile terminal 80 and the communication part 26 of the battery pack 20 is established (S46). Further, communication between the mobile terminal 80 and the work machine 1 via the battery pack 20 is also established (S47).

The user performs an operation of tool registration on the management application (S48). The management application makes a request for battery registration to the battery pack 20 via the communication part 85 (S49). The calculation part 22 of the battery pack 20 receiving the request transmits information of the battery pack 20 to the mobile terminal 80 via the communication part 26 (S50). The transmitted information includes, for example, the type name, serial number, software version, registration date, last connection date and time, etc. of the battery pack 20. The management application stores (registers) the received information of the battery pack 20 (S51). The management application makes a request for tool registration to the work machine 1 via the battery pack 20 (S52). The calculation part 40 of the work machine 1 receiving the request transmits information of the work machine 1 to the mobile terminal 80 via the battery pack 20 (S53). The transmitted information includes, for example, the type name, serial number, registration date, last connection date and time, etc. of the work machine 1. The management application stores (registers) the received information of the battery pack 20 (S54). The management application disconnects the short-range wireless communication between the communication part 85 of the mobile terminal 80 and the communication part 26 of the battery pack 20 (S55). The calculation part 22 of the battery pack 20 disconnects communication with the calculation part 40 of the work machine 1 (S56). The user operates the mobile terminal 80 and terminates the management application (S57). If the registration has been completed, the user can confirm the information of the work machine 1 and the battery pack 20 (S59) by activating the management application and performing a predetermined operation as necessary (S58).

According to the present embodiment, the following effects can be achieved.

(1) The outer surface of the housing 2 of the work machine 1 is provided with the two-dimensional code 15*a* representing the unique information such as the serial number of the work machine 1, the two-dimensional code 15*a* is read by the camera 67, and the read serial number of the work machine 1 is stored in the work machine 1 via the communication adapter 30. Here, the communication adapter 30 relays the communication between the camera 67 and the work machine 1, so that the serial number of the work machine 1 represented by the two-dimensional code 15*a* can be easily stored in the work machine 1. As a result, it is possible to improve the convenience of the work machine 1 and facilitate the management of the work machine 1. It is also conceivable to store the serial number in the storage part 46 of the work machine 1 before assembly, but at the site of the assembly line, it is assumed that the label attached with the two-dimensional code 15*a* is delivered from a printing company and the storage part 46 is delivered from another company. Therefore, it is difficult to manage to make the serial number of the work machine 1 represented by the two-dimensional code 15*a* and the serial number stored in the storage part 46 of the work machine 1 to which the two-dimensional code 15*a* is attached match each other. In contrast thereto, as described above, by the method of reading the two-dimensional code 15*a* attached to the work machine 1 after assembly and storing the serial number in the work machine 1 via the communication adapter 30 connected to the work machine 1, the serial number of the work machine 1 represented by the two-dimensional code 15*a* and the serial number stored in the storage part 46 of the work machine 1 to which the two-dimensional code 15*a* is attached can easily match each other.

(2) Since the communication adapter 30 supplies power to the work machine 1, there is no need to separately prepare a power supply for the work machine 1. Therefore, it is easy to store the serial number of the work machine 1 represented by the two-dimensional code 15*a* in the work machine 1.

(3) The mobile terminal 80 can receive and store the serial number of the work machine 1 by communication with the work machine 1 through the function of the management application, which is convenient. For example, when a plurality of or a large number of similar work machines are registered in the management application of the mobile terminal 80, each work machine is associated with the serial number, thereby facilitating the management. The mobile terminal 80 can also be configured to read the two-dimensional code 15*a* of the work machine 1 by using its two-dimensional code reading function and store the serial number of the work machine 1. In this case, the number of means for storing the serial number of the work machine 1 is increased, which is convenient. The mobile terminal 80 can also be configured to receive and store the usage history information, etc. of the work machine 1 through the function of the management application. In this case, the serial number is associated with the usage history information, etc., thereby facilitating the management. Further, even if the work machine 1 is stolen, for example, the information of the work machine 1 can be confirmed by the management application, which is convenient.

(4) In the POS system, for example, of the shop of the work machine 1, sales management including the serial number of the work machine 1 can be performed by using the two-dimensional code 15*a*, and in after-sales support, the serial number and usage history information of the work machine 1 can be read out from the storage part 46 of the work machine 1 for use, which can improve the convenience of the work machine 1 and facilitate the management of the work machine 1.

(5) The outer surface of the packing box 70 is provided with the two-dimensional code 70*a* that represents the packing box unique information including the serial number of the work machine 1 to be packed in the packing box 70, the two-dimensional code 70*a* is read by the camera 67, the unique information of the work machine 1 and the packing box unique information are compared by the PLC 60 to determine whether the packing box 70 corresponds to the work machine 1, and the lamp 65 is lit in a different manner (different color) according to whether the packing box 70 corresponds to the work machine 1. As a result, the worker can confirm by the lamp 65 whether the packing box 70 into which the work machine 1 is to be put corresponds to the work machine 1. Therefore, it is possible to prevent the work machine 1 from being erroneously packed in the packing box 70 with the serial number different from the work machine 1, and facilitate the management of the work machine 1. At this time, since the unique information of the work machine 1 and the corresponding packing box unique information are set with different identification symbols as "A" and "B", it is possible to distinguish whether the read unique information is the unique information of the work machine 1 or the packing box 70. Therefore, the PLC 60 can notify an error when the worker reads the two-dimensional code 15*a* of the work machine 1 twice, and can suppress packing errors. Further, since the lighting manner (blinking) of the lamp 65 when the writing of the unique information to the work machine 1 is normally completed, and the lighting manner (continuous lighting) of the lamp 65 when the read packing box unique information is normal are set to be different, the worker can recognize the work to be done next (reading the two-dimensional code 70*a* of the packing box 70 or packing the work machine 1 in the packing box 70) by the lighting manner of the lamp 65, which is favorable for workability.

Although the present invention has been described above with reference to the embodiments as examples, it will be understood by those skilled in the art that various modifications can be made to each constituent element and each processing process of the embodiments within the scope of the claims. A modified example will be discussed below.

Figure 14:
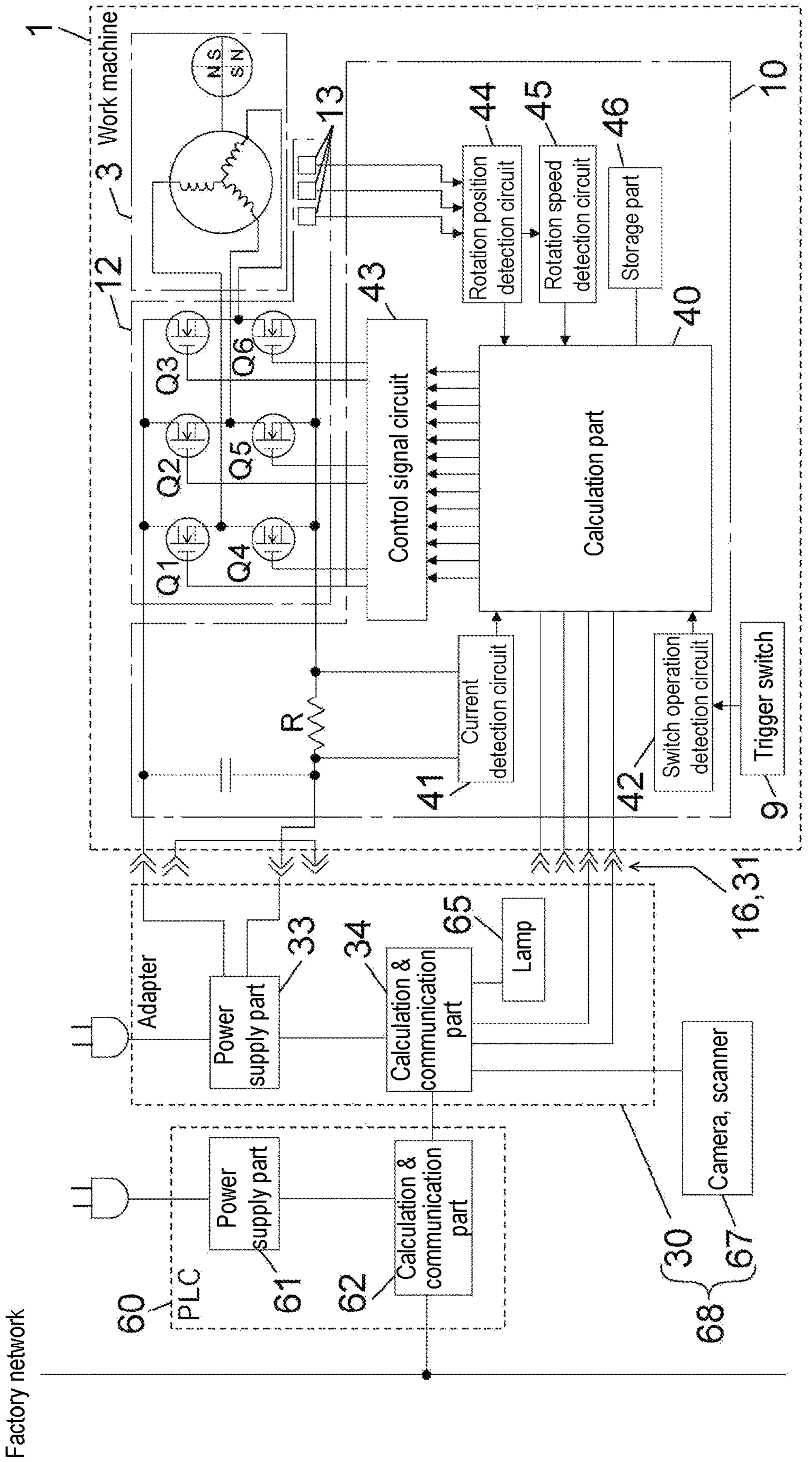
FIG. 14 is a circuit block diagram showing a modified example of the first management system shown in FIG. 8.

FIG. 14 is a circuit block diagram showing a modified example of the first management system shown in FIG. 8. The following description focuses on the differences from FIG. 8. The camera 67 is connected to the calculation/communication part 34 of the communication adapter without the PLC 60 interposed. The information read by the camera 67 is transmitted to the calculation/communication part 34 of the communication adapter 30 without going through the PLC 60. The lighting state of the lamp 65 is controlled by the calculation/communication part 34 of the communication adapter 30. The communication adapter 30 determines whether the unique information of the work machine 1 and the packing box unique information correspond to each other. Thus, the series of operations described in the embodiment may be performed without going through the PLC 60.

The two-dimensional codes 15*a* and 70*a* may be replaced with other codes such as bar codes. The two-dimensional code 15*a* of the work machine 1 may not include the identification symbol. In this case, there is no problem in storing the unique information of the work machine 1 in the work machine 1. The unique information of the work machine 1 may be made different from the packing box unique information by, for example, adding an extra character or the like to the serial number only for the packing box unique information.

What is claimed is:

1. A sensor unit comprising a sensor device, and a communication adapter configured to be mountable to a work machine, the sensor unit comprising:

the sensor device provided separately from the work machine and the communication adapter, and collecting a first unique information unique of the work machine displayed on a first unique information display portion disposed on an outer surface of the work machine as physical information existing outside the sensor unit, converting the physical information collected into collected data, and outputting the collected data; and the communication adapter being attachable to the work machine and configured to relay communication between the sensor device and the work machine when attached to the work machine, wherein the communication adapter comprises:

a first interface configured to be connectable to the sensor device;

a second interface provided separately from the first interface and configured to be electrically connectable to the work machine when attached to the work machine; and a sensor unit controller configured to input the collected data output from the sensor device, and output at least one of the collected data and a generated data generated from the collected data to the work machine via the second interface, wherein the first unique information unique of the work machine displayed on the first unique information display portion disposed on the outer surface of the work machine is collected as physical information by the sensor device, output to the work machine by the sensor unit controller of the communication adapter, and stored in a work machine storage part of the work machine, wherein the physical information or the collected data includes the first unique information unique of the work machine displayed on the first unique information display portion disposed on the outer surface of the work machine, and wherein at least one of the collected data and the generated data, output to the work machine by the sensor unit controller and stored in the work machine storage part of the work machine, includes the first unique information.

2. The sensor unit according to claim 1, wherein the sensor device is configured as an optical sensor device that collects information about light displayed as a two-dimensional code or a barcode as the physical information existing outside the sensor unit.

3. The sensor unit according to claim 1, wherein the first interface is connectable to a computer device, and the sensor unit controller is configured to be communicable with the sensor device via the computer device.

4. The sensor unit according to claim 1, wherein the second interface comprises a first communication terminal configured to be mountable to a battery mounting portion of the work machine and configured to be communicable with the work machine, and a first power supply terminal configured to be capable of supplying power to the work machine.

5. A work machine for mounting the sensor unit according to claim 1, the work machine comprising:

a third interface configured to be communicable with the second interface;

a work machine controller configured to be communicable with the sensor unit controller via the third interface; and a work machine storage part configured as a non-volatile memory communicable with the work machine controller, wherein the work machine controller stores the at least one of the collected data and the generated data input from the communication adapter of the sensor unit via the third interface in the work machine storage part.

6. A communication method for communicating between the sensor unit according to claim 1 and a work machine, the work machine comprising:

a third interface configured to be communicable with the second interface;

a work machine controller configured to be communicable with the sensor unit controller via the third interface; and a work machine storage part configured as a non-volatile memory communicable with the work machine controller, wherein the work machine controller stores the at least one of the collected data and the generated data input from the sensor unit via the third interface in the work machine storage part, the communication method comprising:

inputting the collected data collected by the sensor device to the sensor unit controller;

inputting the at least one of the collected data and the generated data generated from the collected data to the work machine controller via the second interface and the third interface; and storing the at least one of the collected data and the generated data input to the work machine controller in the work machine storage part.

7. A communication method for communicating between the sensor unit according to claim 1 and a work machine, the work machine comprising:

a third interface configured to be communicable with the second interface;

a work machine controller configured to be communicable with the sensor unit controller via the third interface;

a work machine storage part configured as a non-volatile memory communicable with the work machine controller;

a work machine casing configured to accommodate the work machine controller and the work machine storage part; and a unique information display part provided on an outer surface of the work machine casing and displaying unique information that is data unique to the work machine, the communication method comprising:

collecting the unique information displayed on the unique information display part of the work machine as the collected data by the sensor device;

inputting the collected data collected by the sensor device to the sensor unit controller;

inputting the at least one of the collected data and the generated data generated from the collected data to the work machine controller via the second interface and the third interface; and storing the at least one of the collected data and the generated data input to the work machine controller in the work machine storage part.

8. A work machine for mounting a sensor unit comprising a sensor device and a communication adapter configured to relay communication between the sensor device and the work machine, wherein the communication adapter comprises a first interface configured to be connectable to the sensor device, a second interface configured to be connectable to the work machine, and a sensor unit controller, the work machine comprising:

a third interface configured to be communicable with the second interface;

a work machine controller configured to be communicable with the sensor unit controller via the third interface;

a work machine storage part configured as a non-volatile memory communicable with the work machine controller;

a work machine casing configured to accommodate the work machine controller and the work machine storage part; and a unique information display part provided on an outer surface of the work machine casing and displaying unique information that is data unique to the work machine.

9. A management method for managing the work machine according to claim 8, the management method comprising:

connecting a mobile terminal and the work machine controller to be wirelessly communicable with each other directly or indirectly; and transmitting the at least one of the collected data and the generated data stored in the work machine storage part to the mobile terminal by wireless communication, and storing the at least one of the collected data and the generated data in the mobile terminal.

10. A management method for managing the work machine according to claim 8, the management method comprising:

connecting a mobile terminal and the work machine controller to be wirelessly communicable with each other directly or indirectly; and transmitting the unique information stored in the work machine storage part to the mobile terminal by wireless communication, and storing the unique information in the mobile terminal.

11. The management method according to claim 10, comprising:

collecting the unique information displayed on the unique information display part of the work machine by the sensor device;

collecting packing box unique information displayed on a packing box for accommodating the work machine by the sensor device;

determining, by a computer device connected to the sensor device, whether the unique information and the packing box unique information read by the sensor device are preliminarily associated data;

notifying of normality, by the computer device, when the unique information and the packing box unique information are determined to be preliminarily associated data; and notifying of abnormality, by the computer device, when the unique information and the packing box unique information are determined not to be preliminarily associated data by the computer device.

12. The management method according to claim 11, wherein the unique information and the packing box unique information are data at least partially different from each other.

13. A work machine comprising a driving part, a driven part driven by the driving part, and a casing accommodating the driving part and the driven part, the work machine comprising:

a first unique information display part provided on an outer surface of the casing and displaying first unique information that is unique information assigned to each work machine;

a first unique information storage part incorporated in the casing and storing the first unique information; and a communication part incorporated in the casing and configured to be communicable between the first unique information storage part and an external device.

14. A management method for storing first unique information displayed as a bar code or a two-dimensional code in a work machine, the management method comprising:

collecting the first unique information by a code reader serving as a sensor device;

inputting the first unique information collected by the code reader or generated information generated from the first unique information to the work machine by a communication adapter mounted to the work machine; and storing the first unique information input by the communication adapter in a work machine storage part in a state of being incorporated in the work machine.

* * * * *